US007285772B2

(12) United States Patent
Labous et al.

(10) Patent No.: US 7,285,772 B2
(45) Date of Patent: Oct. 23, 2007

(54) LOGGING TOOL WITH A PARASITIC RADIATION SHIELD AND METHOD OF LOGGING WITH SUCH A TOOL

(75) Inventors: Laurent Labous, Sceaux (FR); Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 205 days.

(21) Appl. No.: 11/127,570

(22) Filed: May 12, 2005

(65) Prior Publication Data
US 2006/0054803 A1   Mar. 16, 2006

(30) Foreign Application Priority Data
May 17, 2004  (EP) .................................. 04291261

(51) Int. Cl.
*G01V 5/12* (2006.01)
(52) U.S. Cl. ................ 250/269.1; 250/269.2; 250/269.3; 250/269.7; 250/267
(58) Field of Classification Search ........ 250/253–266, 250/264, 269.1–269.8
See application file for complete search history.

(56) References Cited
U.S. PATENT DOCUMENTS
3,510,654 A    5/1970  Paap et al.
3,842,265 A *  10/1974  Pitts, Jr. .................. 250/269.8
5,397,893 A *   3/1995  Minette ...................... 250/254
5,451,779 A *   9/1995  Spross et al. ............... 250/266
6,666,285 B2* 12/2003  Jones et al. .................... 175/50
2005/0028586 A1* 2/2005  Smits et al. ............. 73/152.14

FOREIGN PATENT DOCUMENTS
EP          0 160 351         11/1985

* cited by examiner

Primary Examiner—Constantine Hannaher
Assistant Examiner—Casey Bryant
(74) Attorney, Agent, or Firm—Bryan L. White; Kevin P. McEnaney; Brigitte L. Echols

(57) ABSTRACT

It is described a logging tool 20 for underground formations surrounding a borehole 14, comprising an elongated body 21 along a major axis; a collar 22 disposed peripherally around said body 21 having a collar wall defined by an inner and an outer surface; a radiation emitting source 201 arranged to illuminate the earth formation 16 surrounding the borehole; at least one radiation detector 211 arranged to detect radiation reflected by the earth formation resulting from illumination by the source 201; at least one source collimation—window 202 and one detector collimation window 212 through which the earth formation is illuminated and radiation is detected; and characterized in that it further comprises at least one radiation shield 30 located between said inner collar surface and the outer surface of the tool, said radiation shield positioned so as to eliminate parasitic radiation that has not traversed the outer collar.

12 Claims, 3 Drawing Sheets

LOGGING TOOL WITH A PARASITIC RADIATION SHIELD AND METHOD OF LOGGING WITH SUCH A TOOL

CROSS-REFERENCE TO RELATED APPLICATIONS

This application claims priority to European Patent Application EP04291261 .8 entitled "Tool Casing with Gamma Ray Window," filed on Mar. 4, 2003 by Cheung et al., which claims priority from PCT Application PCT/EP01/03718 filed on Mar. 29, 2001 and claims priority from French Application No. FR20000004527 filed on Apr. 7, 2000.

FIELD OF THE INVENTION

This invention relates to logging of oil, water or gas well in underground formations surrounding a borehole and more particularly to a logging tool with a parasitic radiation shield such as a logging-while-drilling gamma ray density measurement tool.

DESCRIPTION OF THE PRIOR ART

In hydrocarbon exploration and production, it is of prime importance to determine if a given earth formation contains hydrocarbon, and the amount of hydrocarbon within the formation. Therefore, formation properties while drilling or in a freshly drilled hole are measured to predict the presence of oil, gas and water in the formation. These formation properties may be logged with wireline tools, logging while drilling (LWD) tools, or measurement while drilling (MWD) tools. One method to predict formation properties is to measure the density of material in earth formation using a source of nuclear radiation and a radiation detector. The density of a material can be determined either by a transmission or by a scattering measurement. In a transmission measurement the material, the density of which needs to be determined, is put between the radiation source and the detector. In a scattering measurement the intensity and energy distribution of the radiation scattered back to a detector from the material under investigation is used to determine the density. Downhole measurements of formation density are of the scattering type since it is not usually possible to insert the formation material directly between source and detector, with the possible exception of rock samples removed from the formation.

Gamma-ray scattering systems have been used for many years to measure the density of a material penetrated by a borehole. Typically density is measured as a function of position 25 along the borehole thereby yielding a "log" as a function of depth within the borehole. The measuring tool typically comprises a source of radiation and one or more radiation detectors, which are in the same plane as the source and typically, mounted within a pressure tight container. Radiation impinges on and interacts with the material, and a fraction of the impinging radiation is scattered by the material and a traction thereof will return to the detector. After appropriate system calibration, the intensity of the detected scattered radiation can be related to the bulk density of the material.

The radial sensitivity of the density measuring system is affected by several factors such as the energy of the gamma radiation emitted by the source, the axial spacing between the source and the one or more gamma ray detectors, and the properties of the borehole and the formation. The formation in the immediate vicinity of the borehole is usually perturbed by the drilling process, and more specifically by drilling fluid that invades the formation in the near borehole region. Furthermore, particulates from the drilling fluid tend to buildup on the borehole wall. This buildup is commonly referred to as mudcake, and adversely affects the response of the system. In this way, intervening material between the tool and the borehole wall will adversely affect the tool response. Intervening material in the tool itself between the active elements of the tool and the outer radial surface of the tool will again adversely affect the tool response by producing a background of scattered radiation which is independent of the presence of the borehole fluid, the mudcake or the formation. Typical sources are isotropic in that radiation is emitted with essentially radial symmetry. Flux per unit area decreases as the inverse square of the distance to the source. Radiation per unit area scattered by the formation and back into detectors within the tool also decreases with increasing distance, but not necessarily as the inverse square of the distance. In order to maximize the statistical precision of the measurement, it is desirable to dispose the source and the detector as near as practical to the borehole environs, while still maintaining adequate shielding and collimation.

Prior art logging-while-drilHng systems use a variety of source and detector geometries to minimize standoff, such as placing a gamma ray source and one or more gamma ray detectors outside the tool body within a drill collar with a stabilizer disposed between source and detectors and the borehole and formation; or within stabilizer fins that radiate outward from a drill collar. This tends to minimize intervening material within the tool, and positions source and detectors near the borehole environs, but often at the expense of decreasing the efficiency of shielding and collimation. The signal-to-noise ratio is often degraded by the detection of particles that have not probed the earth formation but instead have traveled trough low-density regions or voids existing in the tool between source and detectors, and especially through collar and stabilizer. Shielding of source and detectors mounted in the tool body is well known in the prior art; chassis is shielded and detectors are mounted in a shielded holder with windows trough which radiation is detected. Other prior art patents focus on total radiation shielding of the tool to the detriment of functionality: EP 0160351 describes a shielded tool casing with windows, which receives instrument package, U.S. Pat. No. 6,666,285 describes an apparatus, which has a cavity to receive a solid shielded instrument package. Those apparatus, because they use a framework totally made of high-density materials, are heavy and brittle, and in harsh drilling conditions, can be broken resulting in the destruction and possibly the loss of the instrument package and more critically the loss of the radioactive source. The problem of providing shielding in the collar and 10 the stabilizer has not been yet addressed successfully.

SUMMARY OF THE INVENTION

The present invention discloses a logging tool for underground formations surrounding a borehole, comprising: an elongated body along a major axis; a collar disposed peripherally around said body having a collar wall defined by an inner and an outer surface. Further, the tool comprises a radiation emitting source arranged to illuminate the earth formation surrounding the borehole; at least one radiation detector arranged to detect radiation reflected by the earth formation resulting from illumination by the source; at least one source collimation window and one detector collimation window through which the earth formation is illuminated and radiation is detected; and at least one radiation shield located between said inner collar surface and the outer surface of the tool, said radiation shield positioned so as to eliminate parasitic radiation that has not traversed the outer collar.

In a preferred embodiment, the tool further comprises a stabilizer located at the periphery around the outer collar surface, wherein this stabilizer comprises a stabilizer wall defined by an inner stabilizer surface and an outer stabilizer surface, and wherein the radiation shield is located between this inner collar surface and this outer stabilizer surface. The stabilizer enhances the contact between the tool and the formation by reducing the space available for mud between the tool and the formation.

The tool is designed so that the source and the detector are as near as practical to the borehole environs. The radiation shields increase the signal to noise ratio. And the invention below proposes a robust, secure and functional configuration.

In a preferred embodiment, the radiation shield is located between the emitting radiation source and the radiation detector and has a length along the axis, which is less than 80% of the distance between the source and the detector. The radiation shield has a thickness in the cross section perpendicular to the major axis, which is preferably less than 40% of the width of the tool at the position of the radiation source. This makes it possible to eliminate a significant fraction of the radiation that are coming from source and that have not passed through the borehole fluid and the formation, but whose path was entirely inside the collar and the stabilizer.

In a preferred embodiment, the radiation shield has an annular shape surrounding the detector window and has a length along the axis, which is less than 40% of the distance between the source and the detector. In a preferred embodiment, the radiation shield has a thickness in the cross section perpendicular to the major axis, which is less than 40% of the width of the tool at the position of emitting radiation source. This enables eliminating a part of the radiations passing through the collar to the detecting window and not through the window in the collar to the detector window.

In a preferred embodiment, this invention is directed toward a radiation density measurement system in underground formations surrounding a borehole with a chemical radioactive source or an electronic radiation source emitting x-ray; or a chemical or electronic neutron source.

In a preferred embodiment, this invention is directed toward a gamma-ray logging-while-drilling density tool. The system comprises a source of gamma radiation and one or more gamma ray detectors. Multiple detectors (2 or more) provide better efficiency and allow compensation for the effect of mud and mudcake intervening between the tool and the formation It is clear, however, that the basic concepts of the invention could be employed in other types and classes of logging, logging-while-drilling or measurement-while-drilling systems. As an example, the invention can be used in a neutron porosity system for measuring formation porosity, wherein the sensor comprises a neutron source and one or more neutron detectors.

The gamma-ray radiation shield is fabricated from a high atomic number material, commonly referred to as "high Z" material. High Z material is an efficient attenuator of gamma-ray radiation, and permits the efficient shielding, collimation and optimum disposition of the source and detectors with respect to the borehole environs.

The present invention also discloses a method for logging a well utilizing a tool as mentioned above.

BRIEF DESCRIPTION OF THE DRAWINGS

Further embodiments of the present invention can be understood with the appended drawings.

DETAILED DESCRIPTION

Figure 1:
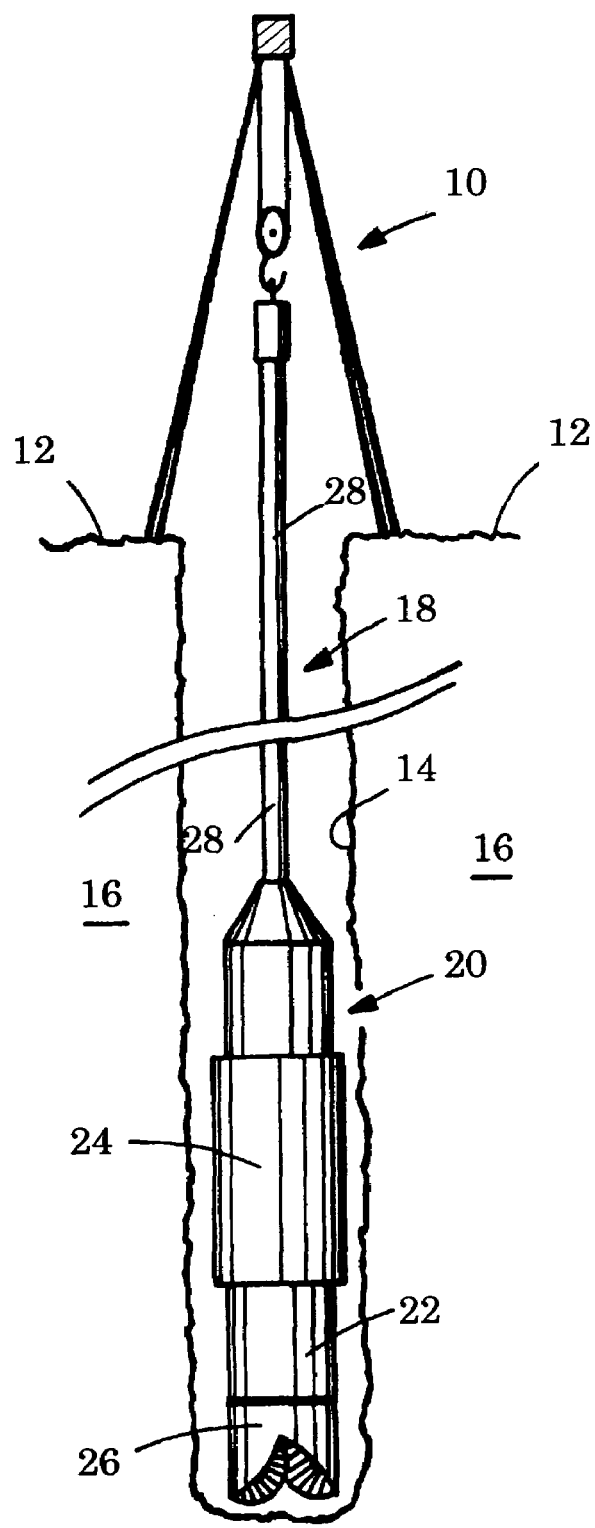
FIG. 1 illustrates a logging-while-drilling tool according to the invention.

FIG. 1 illustrates a logging-while-drilling tool, identified as a whole by the numeral 20, disposed by means of a drill string within a well borehole 18 defined by a borehole wall 14 and penetrating an earth formation 16. The upper end of the collar element 22 of the tool 20 is operationally attached to the lower end of a string of drill pipe 28. The stabilizer element of the tool 20 is identified by the numeral 24. A drill bit 26 terminates the lower end of logging tool 20. It should be understood, however, that other elements can be disposed on either end of the tool 20 between the drill pipe 28 and the drill bit 26. The upper end of the drill pipe 28 terminates at a rotary drilling rig 10 at the surface of the earth 12. The drilling rig rotates the drill pipe 28 and cooperating tool 20 and drill bit 26 thereby advancing the borehole 18. Drilling mud is circulated down the drill pipe 28, through the axial passage in the collar 22, and exits at the drill bit 26 for return to the surface 12 via the annulus defined by the outer surface of the drill string and the borehole wall 14.

Figure 2A:
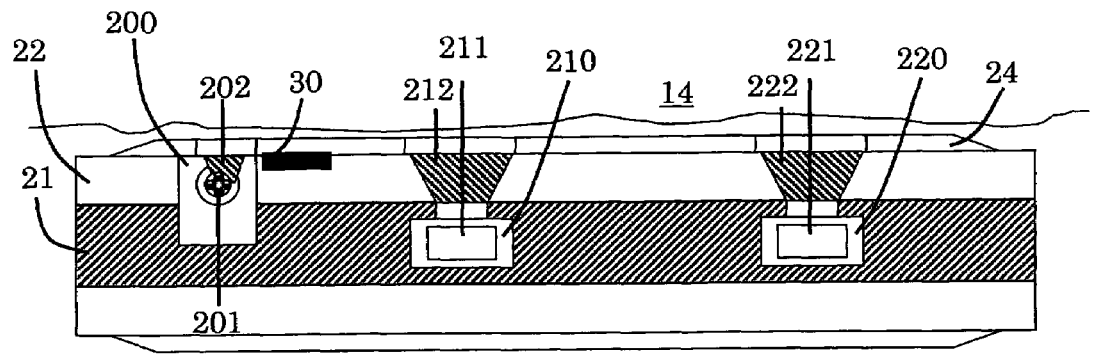
FIG. 2a is a side view on the major axis of the tool of FIG. 1 with the radiation shield localized between source and first detector.
Figure 2B:
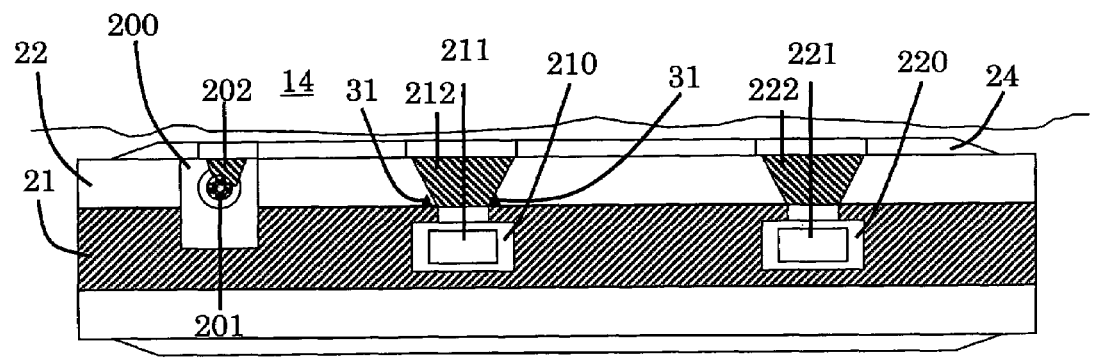
FIG. 2b is a side view on the major axis of the tool of FIG. 1 with the radiation shield localized closed to first detector.
Figure 2C:
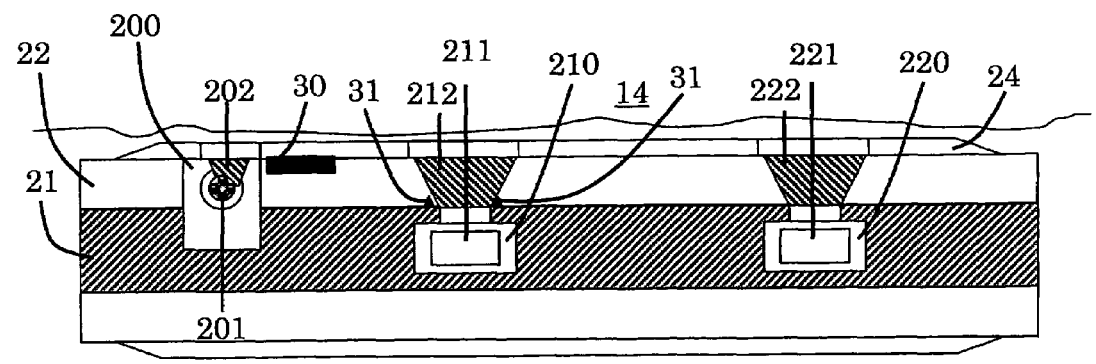
FIG. 2c is a side view on the major axis of the tool of FIG. 1 with both radiation shields.

FIGS. 2a, 2b and 2c illustrate conceptually radiation shields on the tool 20 of FIG. 1 shown in side view on the major axis of the tool. In a first embodiment, the tool is a logging-while-drilling gamma-ray scattering tool with a chemical radioactive source. The tool 20 is made of an elongated tool body 21 and a drill collar 22 disposed peripherally around the tool body 21. In the illustrated tool, a stabilizer 24 is disposed peripherally around the drill collar 22; the stabilizer is optional and reduces the amount of mud between the tool and the formation wall and therefore the influence of the borehole fluid on the measurement. The tool 20 receives one source collimation window 202 through which the earth formation 16 is illuminated by the radiation emitted from the radioactive source, and two detector collimation windows 212 and 222 through which the radiation coming from the outside of the tool 20 is detected. In the illustrated tool, a source of gamma radiation 201 illuminating the earth formation 16 and affixed to a source holder 200, is mounted in the collar wall 22. Though this is the preferred way, other locations for the source 201 are in the tool body 21 or in the stabilizer 24. The source 201 is preferably cesium-137 ($^{137}Cs$) which emits gamma radiation with an energy of 0.66 million electron volts (MeV). Alternately, cobalt-60 ($^{60}Co$) emitting gamma radiation at 1.11 and 1.33 MeV can be used as source material. The tool 20 receives a first or "short spaced" gamma ray detector 211 disposed at a first axial distance from the source 201, and a second or "long spaced" gamma ray detector 212 disposed at a second axial distance from the source, where the second spacing is greater than the first spacing. In the illustrated tool, the detectors are mounted in the tool body 21 in holders: 210 for the first detector and 220 for the second detector. Though this is the preferred way, other locations for the detectors 211, 221 are in the collar wall 22 or in the stabilizer 24. The detectors are preferably scintillation type such as sodium iodide (NaI) or Gadolinium-oxy-ortho-silicate (GSO) to maximize detector efficiency for a given detector size.

Insertion of high-density materials in the collar is often undesirable since the collar supports the stresses inherent to logging conditions, in FIG. 2*a*, a side view of the tool illustrates a radiation shield 30 located in the collar 22 whose shape is optimized to reduce leakage through the collar without affecting its mechanical strength.

The trajectories of gamma rays traveling from the source to the detector are like broken lines, on which each break corresponds to a collision with an electron within the surrounding material. Gamma radiations lose energy by means of the most pertinent reaction here: Compton scatter reaction. After undergoing one or more Compton scattering events, a small fraction of the emitted with reduced gamma-ray energy returns to the tool and is detected by the gamma radiation detector. The function of the radiation shield 30 is to intercept and attenuate by photoelectric absorption or by Compton scattering and subsequent photoelectric absorption, a significant fraction of those gamma rays that travel through the collar or/and stabilizer and that might otherwise go back to the detector after being scattered in the collar or/and stabilizer.

FIG. 2*b* illustrates a side view of the tool with a radiation shield 31 located on the inner collar surface in the collimation window 212 of the first detector 211. The function of the radiation shield 31 is to intercept and attenuate gamma rays traversing the collar to the detecting window.

FIG. 2*c* illustrates a side view of the tool with both radiation shields 30 and 31.

To estimate the amount of gamma ray leakage that is effectively removed by the radiation shields, a Monte-Carlo N-Particle model is built based on the tool plan of FIG. 2. A compromise is found between the effective shielding and the mechanical strength of the tool. The model of source used is a mono-energetic 0.662 million electron volts (MeV) cesium-137 radiation. Pulse-height spectra for energies between 0.1 and 0.5 MeV for the first NaI detector are computed for three different configurations: (1) tool without extra radiation shield, (2) tool with radiation shield 30 as in FIG. 2*a*, (3) tool with radiation shields 30 and 31 as in FIG. 2*c*.

One or more pieces of a high-density material, i.e. a material with a high atomic number (more than Z=70) and a high density (more than 15 g/cc) like tungsten, gold or depleted uranium, are inserted in the collar in a particular locations where their shielding efficiency will be maximal and their influence on the mechanical strength will be minimal. High Z materials are efficient attenuators of gamma radiation, and permit the efficient shielding, collimation and optimum disposition of the source and detectors with respect to the borehole environs.

The radiation shield 30 of FIG. 2*a* is in a preferred embodiment, placed into a cavity in the outer surface of the collar, wrapped in a rubber envelope and then compressed underneath a cover plate screwed onto the collar between the source and the detector. In a preferred embodiment, better efficiency is obtained when length along the axis of this radiation shield is less than 80% of the first axial distance between source and detector; and when thickness of this radiation shield in the cross section perpendicular to the major axis is less than 40% of the width of the tool at the position of the source. In a second preferred embodiment, best efficiency is obtained when length along the axis of this radiation shield is less than 60% of the first axial distance between source and detector; and when thickness of this radiation shield in the cross section perpendicular to the major axis is less than 20% of the width of the tool at the position of the source. The radiation shield is disposed circumferentially around the collar outer surface, and preferably covering less than 180° of this surface. The effectiveness of the radiation shield 30 is maximized when its edge is brought closer to that of the collimation window of the first detector. The effectiveness is also increased when the thickness of the radiation shield is increased or an extension towards the source is made, but at the expense of a lower mechanical strength. As an example of optimization, for a circular part of a tungsten patch, the length along the axis is 58 mm whereas the first axial distance is 170 mm, and the thickness is 7 mm. and for the circular part, the internal radius is 78 mm and the opening angle is 90°.

The radiation shield 30 of FIG. 2*a* can be associated with another radiation shield 31 of FIG. 2*b*, located at the base and very close to the collimator window of the first detector, this radiation shield 31 has an annular shape surrounding this collimator window and with a trapezoidal section. Both radiation shields in this embodiment are illustrated on FIG. 2*c*. The efficiency is maximized with specific angular aperture of the trapezoidal section just as the dimension of the annular shield. Nevertheless, these dimensions of the annular shield are dictated by the requirements for mechanical strength. Therefore, in a preferred embodiment, better efficiency for the radiation shield 31 is obtained when this radiation shield is located between the first detector and the outer stabilizer surface facing the first detector, and when this radiation shield has an annular shape with a length along the axis or a diameter, which is less than 40% of the distance between source and first detector. In a second preferred embodiment, best efficiency for the radiation shield 31 is obtained when this radiation shield has an annular shape with a length along the axis or a diameter, which is less than 20% of the distance between source and first detector. In a preferred embodiment this radiation shield has a thickness in the cross section perpendicular to the major axis, which is less than 40% of the width of the logging-while-drilling tool at the position of emitting radiation source. In a second preferred embodiment, this radiation shield has a thickness in the cross section perpendicular to the major axis, which is less than 20% of the width of the logging-while-drilling tool at the position of emitting radiation source.

Figure 3:
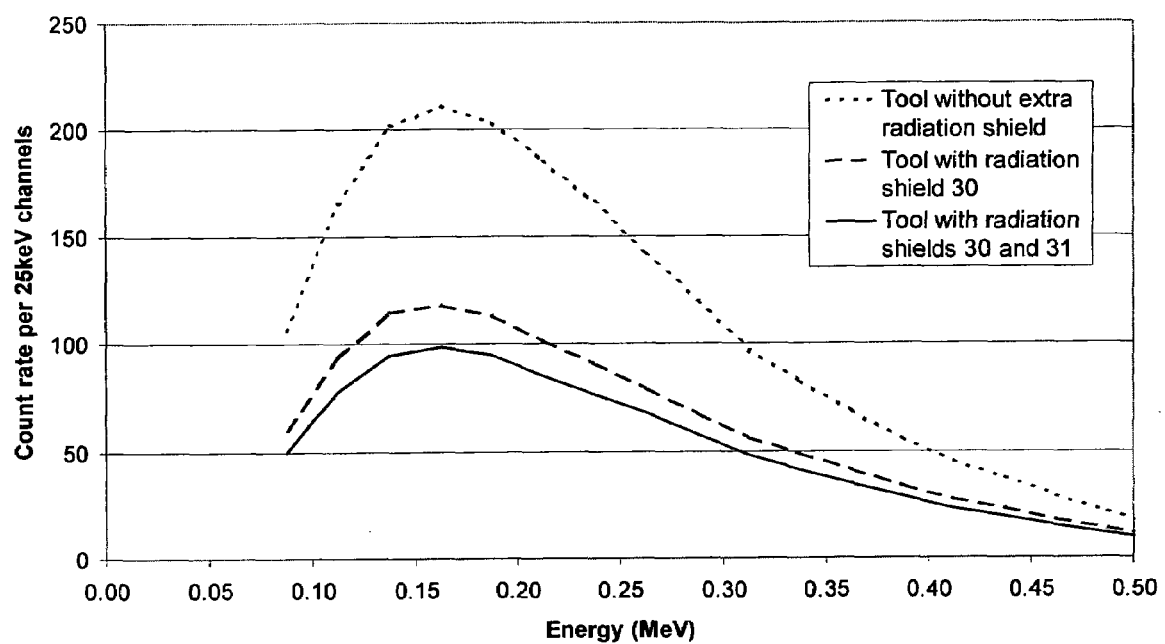
FIG. 3 shows pulse-height spectra obtained by numerical modeling of the logging-while-drilling tool of FIGS. 2a and 2c as well as a case in which neither of the shields 30 and 31 is present.

FIG. 3 shows the pulse-height spectra obtained by numerical modeling of the tool with optimized radiation shields 30 and 31 for the three configurations already described above. In order to determine the amount of gamma-radiation passing through the tool to the detectors, without interacting with the materials in the borehole or the formation, the earth formation is assumed to be very dense like tungsten (17.4 g/cm$^3$) so that practically no gamma-rays will return from the formation and the signal is entirely due to gamma-rays traveling through the collar and the stabilizer. From those data and for an energy range between 0.15 and 0.25 MeV, corresponding to the principal energy used for logging-while-drilling density measurements with a cesium-137 gamma ray source, the percentage of total gamma-ray leakage removed from the total signal by the radiation shields is evaluated. For a stabilizer diameter of 8⅞ inches, the percentage of gamma-ray leakage removed Is of 45% with the radiation shield 30 alone and of 54% with both radiation shields 30 and 31; for a stabilizer diameter of 9⅜ Inches, this percentage is 43% and 51% respectively.

In a second model, the earth formation is assumed to be made of an aluminum alloy (2.805 g/cm³) so gamma-rays will return in this model also from the formation. The percentage 20 of gamma-ray leakage removed from the signal by the radiation shields is evaluated in this model as well and the results are comparable to those obtained with the first model. For a stabilizer diameter of 8⅜ inches, the percentage of gamma-ray leakage removed Is 43% with the radiation shield 30 alone and of 57% with both radiation shields 30 and 31; for a stabilizer diameter of 9⅜ inches, this percentage is 38% and 46% respectively.

The radiation shield 30 removes almost 50% of gamma-ray leakage and the radiation shield 31 removes an additional 10% of gamma-ray leakage. These radiation shields 30 and 31 mounted offer therefore various mechanical, operational and technical advantages.

Radiation shields between first and second detectors or in the collimation window of the long spaced detector are possible; nevertheless this second detector is less sensitive to gamma-ray leakage and a reduction of the leakage is less important.

In a second embodiment, the tool 20 is a logging-while-drilling density tool with an electronic radiation source. The source 201 is an x-rays generator. The shielding materials need to be inserted into the structural materials of the tool body, collar or stabilizer with the intent to optimize shielding with a minimal impact on the structural strength of the tool. Shielding 5 materials for lower energy gamma-rays or x-rays could be lighter materials.

In a third embodiment, the tool 20 is a logging-while-drilling neutron scattering tool with a chemical or electronic neutron source. The source 201 is a chemical source, as Radium-Beryllium source or an electronic source like pulsed neutron generator. The shielding materials need to be inserted into the structural materials of the tool body, collar or stabilizer with the 10 intent to optimize shielding with a minimal impact on the structural strength of the tool. Shielding materials for neutrons will typically be hydrogenous materials and/or neutron absorbing materials, like boron or cadmium for slow neutrons; and will typically be high atomic number materials like tungsten and/or hydrogenous materials for fast neutrons.

The invention claimed is:

1. A logging tool (20) for underground formations surrounding a borehole (14), comprising:
    an elongated body (21) along a major axis;
    a collar (22) disposed peripherally around said body (21) having a collar wall defined by an inner and an outer surface;
    a radiation emitting source (201) arranged to illuminate the earth formation (16) surrounding the borehole;
    at least one radiation detecttor (211) arranged to detect radiation reflected by the earth formation resulting from illumination by the source (201);
    at least one source collimation window (202) and one detector collimation window (212) through which the earth formation is illuminated and radiation is detected;
    at least one radiation shield positioned so as to eliminate patasitic radiation that has not traversed the outer collar and is located between said emitting radiation source and said radiation detector, said radiation shield having a length along the axis that is less than 80% of the distance between said emitting radiation source (201) and said radiation detector (211).

2. The tool of claim 1 further comprising a stabilizer (24) located at the periphery around the outer collar surface, wherein said stabilizer comprises a stabilizer wall defined by an inner stabilizer surface and an outer stabilizer surface, and wherein the radiation shield is located between said inner collar surface and said outer stabilizer surface.

3. The tool of claim 1, wherein another radiation shield (31) has an annular shape surrounding the detector collimation window (212) and has preferably a length along the axis, which is less than 40% of the distance between said source and said detector.

4. The tool of claim 1, wherein said radiation shield has a thickness in the cross section perpendicular to the major axis, which is less than 40% of the width of the said logging tool at the position of said emitting radiation source (201).

5. The tool as claimed in claim 1, wherein the radiation emitting source is chosen in the list of: chemical radioactive source, an electronic radiation source emitting x-ray, a chemical neutron source or an electronic neutron source.

6. The tool of claim 1, wherein said logging tool (20) is a gamma-ray scattering density measurement tool wherein:
    said emitting radiation source (201) is a gamma ray source or an x-ray source;
    a first radiation detector (211) is a short spaced gamma ray detector spaced axially at a first distance from said; and
    a second radiation detector (221) is a long spaced gamma ray detector spaced axially at a second distance, greater than said first distance, from said emitting radiation source.

7. The tool of claim 1, wherein said logging tool (20) is a neutron scattering porosity measurement tool wherein:
    said emitting radiation source is a neutron source; and
    said radiation detector is a neutron detector spaced axially at a first distance from said neutron source.

8. The tool as claimed in claim 1, wherein said radiation shield is made of high atomic number material.

9. The radiation shield as claimed in claim 8, wherein the high atomic number material includes tungsten, depleted uranium, gold or an alloy thereof.

10. The tool as claimed in claim 1, wherein said radiation shield is made of components selected from the list consisting of: hydrogenous material, neutron absorbing materials, boron and cadmium.

11. A method for logging a well comprising the steps of:
    lowering a logging tool in a well; and
    logging well using logging tool;
    wherein the logging tool comprising:
        an elongated body (21) along a major axis;
        a collar (22) disposed peripherally around said body (21) having a collar wall defined by an inner and an outer surface;
        a radiation emitting source (201) arranged to illuminate the earth formation (16) surrounding the borehole;
        at least one radiation detector (211) arranged to detect radiation reflected by the earth formation resulting from illumination by the source (201);
        at least one source collimation window (202) and one detector collimation window (212) through which the earth formation is illuminated and radiation is detected; and
        at least one radiation shield (30) located between said inner collar surface and the outer surface of the tool, said radiation shield positioned so as to eliminate parasitic that has not traversed the outer collar and is located between said emitting radiation source and said radiation detector, said radiation shield having a length along the axis is less than 80% of the distance between said emitting radiation source (201) and said radiation detector (211).

12. A logging tool (20) for underground formations surrounding a borehole (14), comprising:

an elongated body (21) along a major axis;

a collar (22) disposed peripherally around said body (21) having a collar wall defined by an inner and an outer surface;

a radiation emitting source (201) arranged to illuminate the earth formation (16) surrounding the borehole;

at least one radiation detecttor (211) arranged to detect radiation reflected by the earth formation resulting from illumination by the source (201);

at least one source collimation window (202) and one detector collimation window (212) through which the earth formation is illuminated and radiation is detected;

at least one radiation shield located between said inner collar surface and the outer surface of the tool, said radiation shield positioned so as to eliminate parasitic radiation that has not traversed the outer collar; and another radiation shield (31) having an annular shape surrounding the detector collimation window (212).

* * * * *